United States Patent [19]

Bruckert

[11] Patent Number: 5,786,791
[45] Date of Patent: Jul. 28, 1998

[54] METHOD FOR DETERMINING AN ANGLE OF ARRIVAL OF A SIGNAL TRANSMITTED BY A REMOTE UNIT IN A COMMUNICATION SYSTEM

[75] Inventor: Eugene J. Bruckert, Arlington Heights, Ill.

[73] Assignee: Motorola, Inc., Schaumburg, Ill.

[21] Appl. No.: 804,780

[22] Filed: Feb. 24, 1997

[51] Int. Cl.[6] .............................. H04B 7/185; G01S 5/02
[52] U.S. Cl. ............................................................ 342/457
[58] Field of Search .............................. 342/457; 455/456, 455/506, 524, 65

[56] References Cited

U.S. PATENT DOCUMENTS

| | | |
|---|---|---|
| 4,334,185 | 6/1982 | Turney et al. |
| 4,636,796 | 1/1987 | Imazeki. |
| 4,833,478 | 5/1989 | Nossen. |
| 5,334,984 | 8/1994 | Akaba ................................. 342/149 |
| 5,444,451 | 8/1995 | Johnson et al. ..................... 342/453 |
| 5,592,181 | 1/1997 | Cai et al. ............................. 342/457 |

*Primary Examiner*—Theodore M. Blum
*Attorney, Agent, or Firm*—Kenneth A. Haas

[57] ABSTRACT

Location of a remote unit within a wireless communication system is determined by utilizing an Amplitude Difference-based Angle Of Arrival estimation (AD-AOA). In particular, a prompt ray (401) from a signal (117) having undergone multi-path scattering is received at multiple antennas (103 and 105). The prompt rays (401) received at each antenna are combined by a signal combiner and averager (307). The signal combiner and averager (307) then averages the energy of the summed prompt ray over multiple power control groups to determine an accurate energy level for the summed prompt ray. The averaged energy value for the summed prompt ray is then output to an AOA computer (309), along with the average energy value for summed prompt rays at other sectors. The energy values for the summed prompt rays received from each sector are analyzed to determine an appropriate angle of arrival.

12 Claims, 4 Drawing Sheets

METHOD FOR DETERMINING AN ANGLE OF ARRIVAL OF A SIGNAL TRANSMITTED BY A REMOTE UNIT IN A COMMUNICATION SYSTEM

FIELD OF THE INVENTION

The present invention relates generally to wireless communication systems and, in particular, to a method and apparatus for determining an angle of arrival of a signal transmitted by a remote unit in a wireless communication system.

BACKGROUND OF THE INVENTION

It is well known that a remote unit's location within a wireless communication system may be determined using an Amplitude Difference-based Angle Of Arrival estimation (AD-AOA). Such a method of AD-AOA location is described in U.S. Pat. No. 4,636,796, RADIO DIRECTION FINDING SYSTEM, by Imazeki and U.S. Pat. No. 4,833,478, AUTOMATIC DIRECTION FINDER ANTENNA ARRAY, by Nossen. Both patents are incorporated by reference herein. According to such a method, the angle of arrival of a signal transmitted from a remote unit is determined by analyzing the amplitude differences between multiple antennas at a base site. Such a method is illustrated in FIGS. 1-2. As shown in FIG. 1, sectorized base site 101 comprising a plurality of receive antennas 103-113 receives signal 115 transmitted from remote unit 117. As is evident, antennas 103 and 105 in sector α will receive signal 117 at a different angle of arrival than antennas 107 and 109 in sector β. Because of this, antennas in sector α will also receive signal 117 at a different amplitude than antennas sector β. It is the difference in receive amplitudes of signal 117 at various antennas that is utilized in determining the angle of arrival of signal 117.

FIG. 2 illustrates attenuation of signal 117 as a function of angle of arrival. As shown, at the boresight (or direction of maximum gain) the 105° cell site antennas in sector α have approximately an 11 dB gain. At 20° from boresight, the gain is only slightly reduced, however, antennas in sector β have a gain of only 1 dB at this angle of arrival a direction 100° from their boresight resulting in a signal difference of 10 dB. This difference is reduced as the angle of arrival of signal 117 is shifted towards sector β away from sector α. It is this relationship between signal amplitude at each sector antenna that is utilized in AD-AOA determination. A table look-up may be used to equate the measured amplitude difference to an angle of arrival.

In a land mobile environment, received signals from remote units undergo multipath scattering. In other words, a signal transmitted by a subscriber undergoes multiple reflections before it is received at a receiver, and these reflections cause "echoes" of the transmitted signal to be received by the receiver. These echoes are generally of different amplitudes and different time delays, and therefore cause a signal received from each subscriber to actually consist of a multiplicity of signals (a first arriving, or prompt, signal and its echoes), each having a different amplitude, angle of arrival, and time delay. Because prior-art methods of AD-AOA fail to take into consideration such multi-path scattering, any determination of an angle of arrival is corrupted by multi-path scattering. Additionally, prior-art methods of AD-AOA fail to ensure that the receiver gains at all antennas are equal. Failure to do so adds appreciable error to any angle of arrival determined.

Because prior-art methods of AD-AOA fail to take into consideration multi-path scattering, and fail to ensure that receiver gains at all antennas are equal, prior-art interference methods of AD-AOA are deficient in the estimation of any angle of arrival. Therefore, a need exists for a method and apparatus for determining an angle of arrival of a remote unit in a wireless communication system with improved AD-AOA estimation that accounts for multipath scattering of the received signals as well as accounting for unequal receiver gains.

DETAILED DESCRIPTION OF THE DRAWINGS

Figure 1:
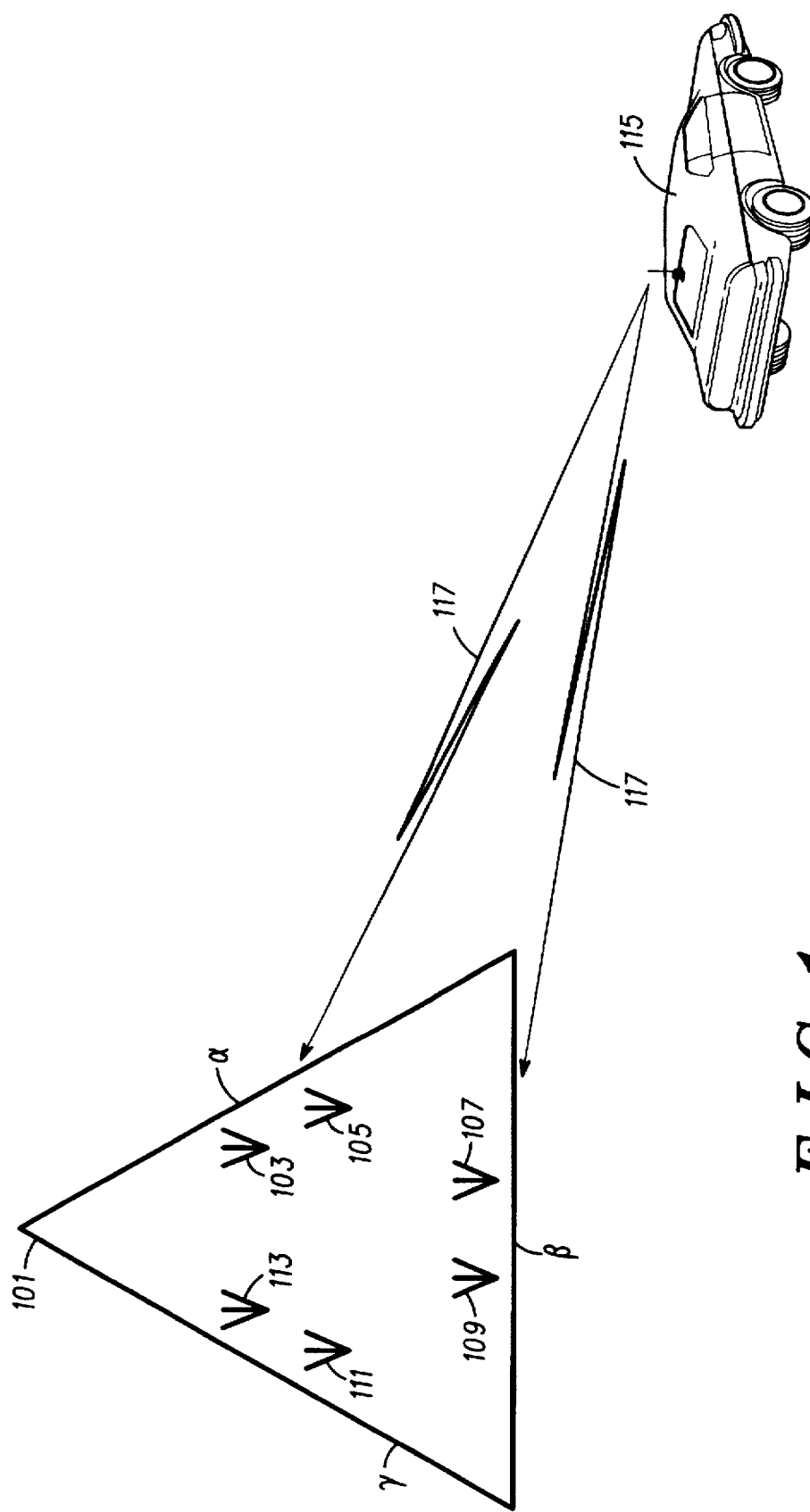
FIG. 1 illustrates the use of Amplitude Difference based Angle Of Arrival (AD-AOA) in a wireless communication system.
Figure 2:
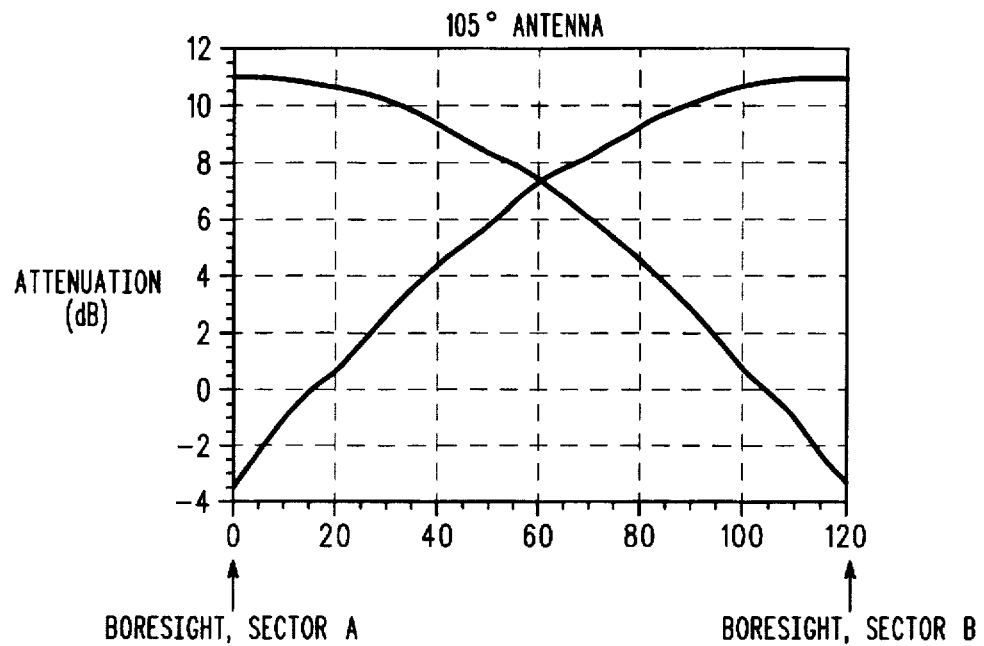
FIG. 2 illustrates attenuation of a radio-frequency (RF) signal as a function of angle of arrival.

Stated generally, location of a remote unit within a wireless communication system is determined by utilizing an Amplitude Difference-based Angle Of Arrival estimation (AD-AOA). In particular, a prompt ray from a signal having undergone multi-path scattering is received at multiple antennas. The prompt rays received at each antenna are combined by a signal combiner and averager. The signal combiner and averager then averages the energy of the summed prompt ray over multiple power control groups to determine an accurate energy level for the summed prompt ray. The averaged energy value for the summed prompt ray is then output to an AOA computer, along with the average energy value for summed prompt rays at other sectors. The energy values for the summed prompt rays received from each sector are analyzed to determine an appropriate angle of arrival.

The present invention encompasses a method for determining remote unit location in a communication system. The method comprises receiving an RF signal at a first and a second antenna existing within a sectorized base site, the RF signal comprising a plurality of rays produced by undergoing multi-path scattering, and identifying a prompt ray from the plurality of rays received at the first and second antenna. An angle of arrival of the RF signal is determined by analyzing the prompt rays received at the first and the second antennas. In the preferred embodiment of the present invention the angle of arrival is determined by determining an energy of the prompt ray identified at the first and second antennas and then determining an angle of arrival from the energy of the prompt rays identified at the first and second antennas.

The present invention additionally encompasses a method for determining remote unit location in a communication system. The method comprises the steps of receiving an RF signal at a first antenna existing within a first sector of a sectorized base site. The RF signal comprises a plurality of rays produced by undergoing multi-path scattering. The RF signal is additionally received at a second antenna existing within the first sector of the sectorized base site. A prompt ray is identified at each antenna within the sector and these prompt rays are summed to produce a summed prompt ray. Finally an angle of arrival is determined based on the summed prompt ray. In particular, an angle of arrival is determined by determining a first energy of the summed prompt ray and summing the prompt ray received at a third antenna with the prompt ray received at a fourth antenna to produce a second summed prompt ray. An energy of the second summed prompt ray is determined and an angle of arrival is determined based on the first and the second energy.

Finally, the present invention encompasses an apparatus for determining remote unit location in a communication system, the apparatus comprising a first receiver existing within a sectorized base site, the first receiver having a radio frequency (RF) signal input and having a prompt ray as an output, the prompt ray produced by the RF signal undergoing multi-path scattering. The apparatus further comprises a second receiver existing within the sectorized base site, the second receiver having a second RF signal input and having the prompt ray as an output. Finally, the receiver comprises an angle of arrival computer having the prompt ray from the first receiver and the prompt ray from the second receiver as inputs, and having an angle of arrival of the RF signal as an output.

Figure 3:
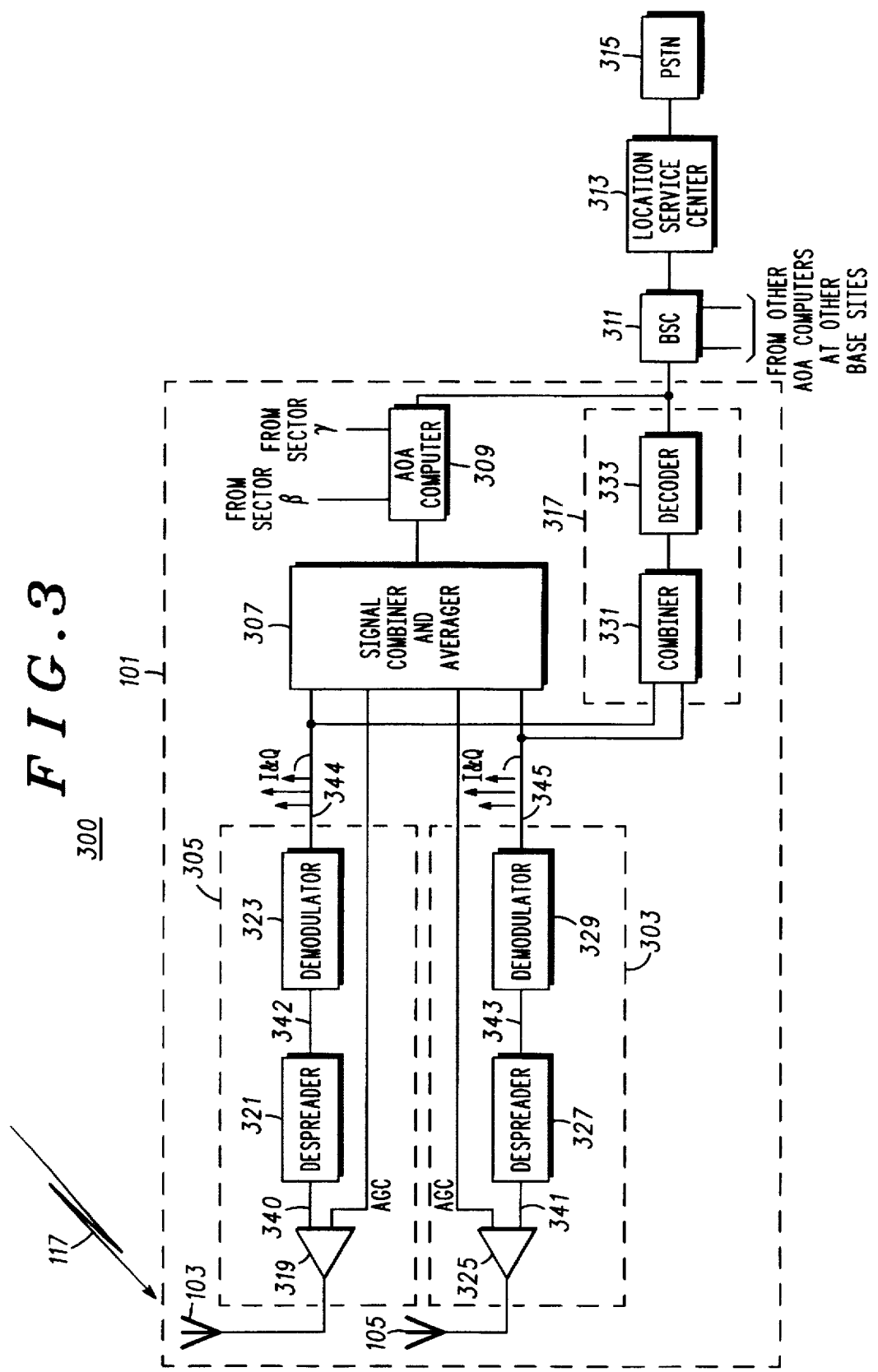
FIG. 3 is a block diagram of a communication system in accordance with the preferred embodiment of the present invention.

FIG. 3 is a block diagram of communication system 300 in accordance with the preferred embodiment of the present invention. In the preferred embodiment of the present invention, communication system 300 utilizes a Code Division, Multiple Access (CDMA) system protocol as described in detail in TIA/EIA Interim Standard IS-95A, Mobile Station-Base Station Compatibility Standards for Dual-Mode Wideband Spread Spectrum Cellular Systems, Telecommunications Industry Association, Washington, D.C. July 1993 (IS-95A) which is incorporated by reference herein. Although in the preferred embodiment of the present invention, communication system 300 utilizes a CDMA system protocol, communication system 300 may utilize other system protocols such as, but not limited to, the Narrowband Advanced Mobile Phone Service (NAMPS) protocol, the Advanced Mobile Phone Service (AMPS) protocol, the Personal Digital Cellular (PDC) protocol, the Global System for Mobile Communications (GSM) protocol, Two-Way Paging protocols, or the United States Digital Cellular (USDC) protocol.

As shown, communication system 300 comprises sectorized base site 101 comprising three sectors, each sector of base site 101 having parallel pointed antennas 103 and 105 coupled to respective receivers 303 and 305. Although base site 101 is shown as a three-sector base site, in alternate embodiments of the present invention, base site 101 can contain any number of sectors. Receivers 303 and 305 are, in turn, coupled to signal combiner and averager 307 and base site circuitry 317. As shown, signal combiner and averager 307 is coupled to AOA computer 309, having an output to base site controller (BSC) 311. Although in the preferred embodiment of the present invention AOA computer 309 is shown within base site 101, in an alternate embodiment of the present invention, AOA computer may be located elsewhere within communication system 300 (e.g., within BSC 311). Although not shown in FIG. 3, antennas 103 and 105, receivers 303 and 305, and signal combiner 307 are duplicated in each sector of base site 101, with the output from each signal combiner and averager 307 sent to AOA computer 309.

Figure 4:
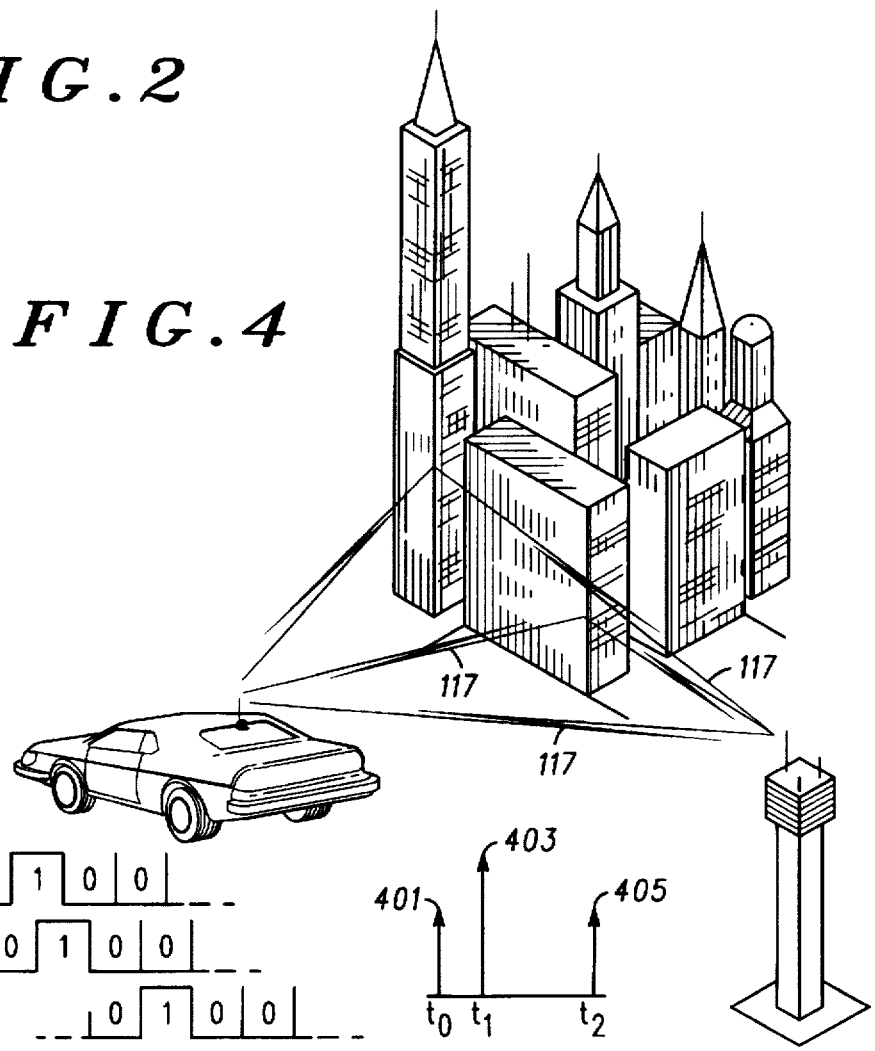
FIG. 4 illustrates reception an RF signal undergoing multiple reflections.

Operation of Communication system 300 in accordance with the preferred embodiment of the present invention occurs as follows: Encoded spread-spectrum digital signal 117 is received at antennas 103 and 105 (and possibly at other antennas within communication system 300). In the preferred embodiment of the present invention, signal 117 comprises a multiplicity of frequency and time overlapping coded signals from individual remote units. Each of these signals is transmitted simultaneously at the same radio frequency (RF) and is distinguishable only by its specific modulation and spreading. In other words, the uplink signal received at a base-station receiver is a composite signal of each transmitted signal, and an individual subscriber's signal is distinguishable only after despreading and demodulation. Signal 117 is amplified by amplifiers 319 and 321 resulting in amplified signals 340 and 341. Signals 340 and 341 are input into despreaders 321 and 327 respectively, where they are despread and output as despread signals 342 and 343 to demodulators 323 and 329 respectively. Signals 342 and 343 (representing transmission from a single remote unit) are then demodulated into in-phase (I) and quadrature (Q) components 344 and 345. As discussed above, the I and Q components have undergone multiple reflections before being received, and these reflections cause echoes of the I and Q components to be output by receivers 303 and 305. As illustrated in FIG. 4, these echoes are generally of different amplitudes and different time delays, and therefore cause each remote units I and Q component to actually consists of a multiplicity of components (the prompt component 401 and its echoes 403 and 405), each having a different amplitude, angle of arrival, and time delay. For simplicity FIG. 3 illustrates prompt component 401 and its echoes 403 and 405 emerging from a single despreader/demodulator combination, although in the preferred embodiment of the present invention, receivers 303 and 305 assign separate despreader/demodulator pairs (321/323 and 327/329) to each component 401, 403, and 405 of signal 117.

Continuing, I and Q components and their echoes (signals 344 and 345) are then simultaneously output by receivers 303 and 305 to signal combiner and averager 307 and base site circuitry 317. In the preferred embodiment of the present invention, base site circuitry 317 comprises the necessary circuitry to perform standard CDMA combining and decoding of each remote unit's I and Q components as described in IS-95A. For example, prior-art combiner 331 receives the I and Q components and their echoes from each receiver 303 and 305, and combines the echoes to form one coherent signal (i.e., six components are received (three from each antenna), the components are then combined into one). Stated differently, signals 344 and 345, containing a particular remote unit's transmission (having undergone scattering) is output from despreaders 321 and 327 as despread signals 343 and 343 respectively. Despread signals 342 and 343 are demodulated by demodulators 323 and 329 respectively resulting in six despread demodulated signals transmitted from the remote unit, (three from each antenna), each containing I and Q components. Prior-art combiner 331 combines all components and echoes received to form one coherent I and Q signal. This signal is grouped into predetermined length groups (e.g., 64 sample length groups) of sampled signals that are independently input to orthogonal decoder 333 for subsequent decoding.

In the preferred embodiment of the present invention the I and Q components and echoes for a remote unit requiring AD-AOA estimation enter signal combiner and averager 307 and undergo signal combining such that individual I and Q component are summed, resulting in summed I and Q component. Stated differently, the first arriving component (i.e., prompt ray 401) from antenna 103 is not summed with echoes 403 or 405, but instead summed with prompt ray 401 from antenna 105 to form a summed prompt ray. Additionally echo 403 from antenna 103 is summed with echo 403 from antenna 105, and echo 405 from antenna 103 is summed with echo 405 from antenna 105. In the preferred embodiment of the present invention, this summing results in three I and three Q components. In the preferred embodiment of the present invention signal combiner and averager 307 averages the energy of the summed prompt ray over multiple power control groups to determine an accurate energy level for prompt ray 401.

The averaged energy value for the summed prompt ray is then output to AOA computer 309, along with the average energy value for summed prompt rays at other sectors. The energy value for the prompt rays received at each sector are analyzed to determine the appropriate angle of arrival. In the preferred embodiment of the present invention this is accomplished using AD-AOA techniques that will be described below. Once the actual angle of arrival of signal 117 is determined by AOA computer 309, it is output to BSC 311 and to location service center 313.

One problem that may be encountered by implementation of the preferred embodiment of the present invention is that a signal amplitude to one sector may be larger than to either of the other two sector (which may be so low that the energy measurement is too corrupted by noise to be useful). In the preferred embodiment of the present invention, a number of means are employed to get around this problem. For example, signal 117 can increased by either setting the power control bits to high for an interval or by requesting a special message be sent by the remote unit as described in U.S. patent Ser. No. 08/794,704 METHOD AND APPARATUS FOR DETERMINING REMOTE UNIT LOCATION IN A COMMUNICATION SYSTEM by Bruckert et al., and assigned to the assignee of the present invention. Then the signal can be demodulated coherently by transmitting a known signal or by demodulating the strongest signal and using it to demodulate the weaker signals.

In the preferred embodiment of the present invention amplifiers 319 and 325 utilize Automatic Gain Control (AGC) as described in U.S. Pat. No. 4,334,185 A CIRCUIT FOR AUTOMATIC GAIN CONTROL WITH CONSTANT RESPONSE TIME, by Turney et al., and assigned to the assignee of the present invention. Therefore, the amplitude of signals 340 and 341 output from amplifiers 319 and 325 are held constant. AGC results in unmatched receiver gains from antenna to antenna and from sector to sector. For example, a signal coming in on boresight to one pair of diversity antennas should have the same amplitude if it were moved over to the boresight of another sector. Because of AGC, this may not be the case. Therefore, accommodations must be made to amplifiers having different gains in order to undo the effect of AGC. In the preferred embodiment of the present invention this is accomplished by calibrating each receiver with a known amplitude signal. In particular, a calibration signal is inserted at the base of at antennas 103 and 105 (and all antennas within communication system 300) at periodic intervals. Normal AGC is performed on the calibration signal and an AGC value (amplifier gain value) is output to signal combiner and averager 307. This is shown in FIG. 3 as output signals 346 and 347 from amplifiers 319 and 325 respectively. Signal combiner and averager 307 utilizes the AGC values 346 and 347 to scale I and Q signals 344 and 345 accordingly.

Figure 5:
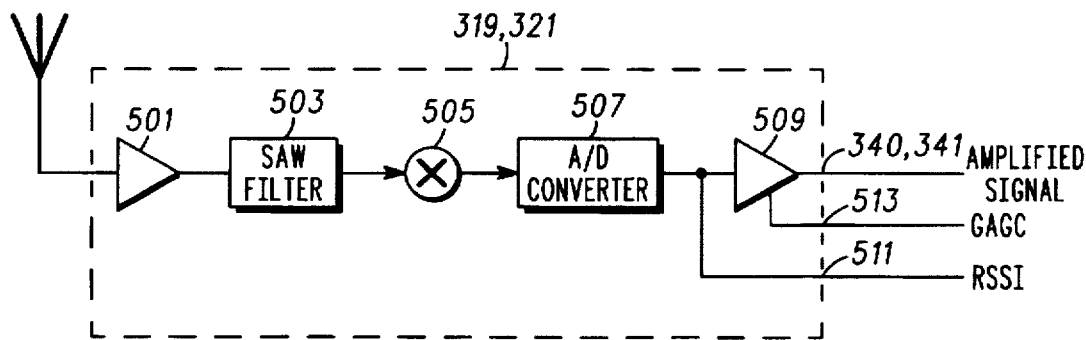
FIG. 5 is a block diagram of the amplifier of FIG. 3 in accordance with the preferred embodiment of the present invention.

FIG. 5 is a block diagram of an amplifier of FIG. 3 in accordance with the preferred embodiment of the present invention. The amplifier comprises first amplifier 501, Surface Acoustic Wave (SAW) filter 503, local oscillator 505, Analog to Digital (A/D) converter 507, and AGC amplifier 509. In addition to output of the A/D converter 511 there is output AGC gain value 513 and amplifier output 340, 341. The output of AGC amplifier 509 is a constant voltage to within the $\approx 100$ μsec attack time. In other words, the mean power of a 1.25 ms power control group (PCG) interval is constant and the same for all intervals and all antenna branches. In the preferred embodiment of the present invention, AGC is fast enough to follow the ensemble fading and even the ensemble pulse amplitude modulation due to vocoder rate adaptation (a busy hour phenomenon). The energy of a ray at amplified signal 340, 341 is simply the energy at output 511 multiplied by the AGC gain ($G_{AGC}$). In the preferred embodiment of the present invention the gain is not changed in the middle of a Walsh symbol as this would affect the demodulator output and possibly give an erroneous result for very heavy traffic loading.

The finger demodulator can provide signal combiner and averager 307 with an estimate (Pmcc) of the selected ray power as a fraction of the total (which as has been shown earlier is a constant). Therefore, the power prior to the AGC amplifier 509 is $Pmcc/G_{AGC}$. The gain (GB) from the antenna input terminals to the A/D converter output is found by two levels of calibration, the first a one-time effort measuring the fixed portion of the gain and a second, periodic calibration, measuring the time varying portion. It can be approximated that the branch gain variation is fixed over the duration of the location interval. The signal levels of the α and β sectors are:

$$A\alpha = (\Sigma(Pmcc,1,\alpha/G_{AGC},1,\alpha)/GB,1,\alpha + \Sigma(Pmcc,2,\alpha/G_{AGC},2,\alpha)/GB,2,\alpha)/2$$

$$A\beta = (\Sigma((Pmcc,1,\beta/G_{AGC},1,\beta)/GB,1,\beta + \Sigma(Pmcc,2,\beta/G_{AGC},2,\beta)/GB,2,\beta)/2$$

where

Pmcc,N,x=the average signal power from the $N^{th}$ antenna in the $x^{th}$ sector, and $G_{AGC}$,N,x=the AGC gain of the $N^{th}$ antenna branch in the $x^{th}$ sector.

The desired statistic is merely the ratio Aα/Aβ. Typically, Pmcc is found by averaging over a PCG, because $G_{AGC}$ can change from PCG to PCG implying the $Pmcc/G_{AGC}$ term must be limited to a PCG. Instead of averaging the two signal branches, in an alternate embodiment of the present invention the larger of the two is selected to use in the sum.

Turning now to the demodulator. The output 344, 345 of a finger from one antenna provides an estimate of the selected signal amplitude. Actually, the finger voltage output (v) is the sum of the signal voltage (s) and a noise term (n) with variance=(amplified signal−Pmcc)/64:

$$v = s(t) + n(t)$$

Assuming the signal is known, v can be vector summed over an interval of k samples at least the duration of a PCG prior to squaring to improve the estimate. The equation (linear, not dB) is $$V_{avg} = (\Sigma s + \Sigma n)/6$$
$$= s + \Sigma n/6.$$

Solving for Pmcc, $$Pmcc = s^2 = V_{avg}^2 - \Sigma n^2/36 - 2*s*\Sigma n/6 - 2*\Sigma(n_i n_j)/36.$$

Typically, $Vavg^2$ is output by the demodulator and used elsewhere to set the pcb polarity. The approximation of replacing $n^2$ by its expected value, $$Pmcc=S^2=Vavg^2-var(n)/6,$$

holds if sufficient averaging is performed on both DC terms to reduce the effect of the two above AC terms plus an extra one due to the weighting per PCG of $G_{AGC}$. Even so, if the signal term gets too close to the noise term, the value should not be used in further processing steps.

There are two ways to estimate the variance of n. Noting that $$amplified\ signal=\Sigma(Walsh\ 0\ to\ 63)^2,$$

where Walsh N=value of the $N^{th}$ output port of the fast Hadamard transformer used in the demodulation of the signal.

$$var(n)=(amplified\ signal-Vavg^2)/63=amplified\ signal/64\ \text{for s small};$$

or, $$var(n)=(\Sigma Walsh(i)^2-v^2)/63.$$

A superior estimate can be made by averaging over many PCGs in the former or Walsh symbols in the latter equation. Finally, if amplified signal is identically a constant, var(n) can be found analytically.

Figure 6:
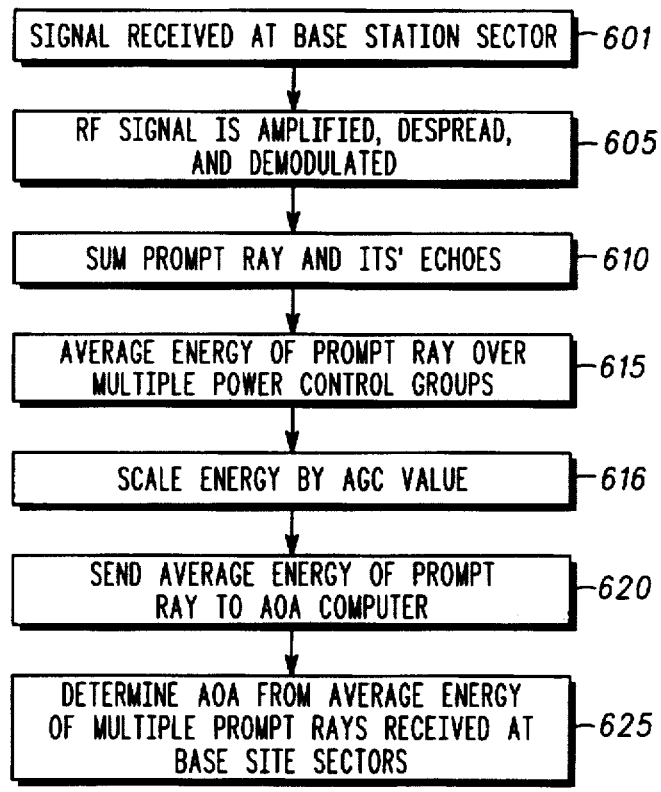
FIG. 6 is a flow chart illustrating operation of the base station of FIG. 3 in accordance with the preferred embodiment of the present invention.

FIG. 6 is a flow chart illustrating operation of the base station of FIG. 3 in accordance with the preferred embodiment of the present invention. The logic flow starts at step 601 where an RF signal 117 is received at a base station sector. In the preferred embodiment of the present invention, RF signal 117 is received at two receive antennas per sector in order to take advantage of spatial diversity. Next, at step 605, RF signal 117 is amplified, despread, and demodulated. At step 610, the prompt ray received at both sector antennas is combined, and then averaged over multiple power control groups (step 615). In the preferred embodiment of the present invention, the summed prompt ray is averaged over one power control group to determine an accurate measurement of the energy of the prompt ray. The value of the average energy of the prompt ray is then scaled by an AGC gain value (step 616) and sent to AOA computer along with the scaled average energy of prompt rays received at other base site sectors (step 620), and at step 625 an angle of arrival for RF signal 117 is determined utilizing AD-AOA methods. More particularly, the angle of arrival for RF signal 117 is determined by summing 16 scaled power control group average energies from each antenna, taking the dB difference between the largest sum and the next largest and referring to a table look-up that relates amplitude difference to angle of arrival.

While the invention has been particularly shown and described with reference to a particular embodiment, it will be understood by those skilled in the art that various changes in form and details may be made therein without departing from the spirit and scope of the invention, and it is intended that all such changes come within the scope of the following claims.

What is claimed is:

1. A method for determining an angle of arrival of a remote unit in a Code Division, Multiple Access (CDMA) communication system, the method comprising the steps of:

receiving an RF signal at a first antenna existing within a sectorized base site, the RF signal comprising a plurality of rays produced by undergoing multi-path scattering;

receiving the RF signal at a second antenna existing within the sectorized base site;

identifying a prompt ray from the plurality of rays received at the first antenna;

identifying the prompt ray from the plurality of rays received at the second antenna; and determining the angle of arrival from the prompt ray received at the first and the second antenna.

2. The method of claim 1 wherein the step of determining the angle of arrival comprises the steps of:

determining an energy of the prompt ray identified at the first antenna;

determining an energy of the prompt ray identified at the second antenna; and determining the angle of arrival from the energy of the prompt ray identified at the first antenna and the energy of the prompt ray identified at the second antenna.

3. The method of claim 2 wherein the step of determining the energy of the prompt ray comprises averaging the energy of the prompt ray over a plurality of power control groups.

4. The method of claim 2 wherein the step of determining an angle of arrival comprises the steps of determining the angle of arrival based on a ratio of the energy of the prompt ray identified at the first antenna to the energy of the prompt ray identified at the second antenna.

5. The method of claim 1 wherein the step of determining the angle of arrival comprises the steps of:

determining a first energy of the prompt ray received at the first antenna;

determining a second energy of the prompt ray received at the second antenna;

determining an amplifier gain value;

adjusting the first and the second energy of the prompt ray by the amplifier gain value; and determining the angle of arrival based on the adjusted first energy of the prompt ray.

6. The method of claim 1 wherein the communication system is a code division, multiple access (CDMA) communication system.

7. A method for determining an angle of arrival of a remote unit in a communication system, the method comprising the steps of:

receiving an RF signal at a first antenna existing within a first sector of a sectorized base site, the RF signal comprising a plurality of rays;

receiving the RF signal at a second antenna existing within the first sector of the sectorized base site;

identifying a prompt ray from the plurality of rays received at the first antenna;

identifying the prompt ray from the plurality of rays received at the second antenna;

summing the prompt ray received at the first antenna with the prompt ray received at the second antenna to produce a summed prompt ray; and determining the angle of arrival from the summed prompt ray.

8. The method of claim 7 wherein the step of determining the angle of arrival comprises the steps of:

determining a first energy of the summed prompt ray;

summing the prompt ray received at a third antenna with the prompt ray received at a fourth antenna to produce a second summed prompt ray;

determining a second energy of the second summed prompt ray; and determining the angle of arrival from the first energy and the second energy.

9. The method of claim 8 wherein the step of determining the first energy of the summed prompt ray comprises averaging the energy of the summed prompt ray over a plurality of power control groups.

10. The method of claim 8 wherein the step of determining the angle of arrival comprises the steps of determining the angle of arrival based on a ratio of the first energy to the second energy.

11. The method of claim 7 wherein the step of determining the angle of arrival comprises the steps of:

determining an energy of the summed prompt ray;

determining an amplifier gain value;

adjusting the energy of the summed prompt ray by the amplifier gain value; and determining the angle of arrival based on the adjusted energy of the summed prompt ray.

12. The method of claim 7 wherein the communication system is a code division, multiple access (CDMA) communication system.

* * * * *